United States Patent [19]

Kawaguchi et al.

[11] Patent Number: 5,302,690
[45] Date of Patent: Apr. 12, 1994

[54] PROCESS FOR PREPARING POLYESTER RESIN AND THE POLYESTER RESIN THEREBY PREPARED

[75] Inventors: Kuniaki Kawaguchi; Kenji Hijikata; Toshio Nakane, all of Shizuoka, Japan

[73] Assignee: Polyplastics Co., Ltd., Osaka, Japan

[21] Appl. No.: 892,898

[22] Filed: Jun. 3, 1992

[30] Foreign Application Priority Data

Jun. 3, 1991 [JP] Japan ................................. 3-131235
Jun. 3, 1991 [JP] Japan ................................. 3-131236

[51] Int. Cl.⁵ ............................................. C08G 63/85
[52] U.S. Cl. ................................ 528/279; 528/272; 528/295; 528/297; 528/298; 528/302; 528/308; 528/308.6; 528/88; 528/97; 528/99; 528/103; 528/112; 528/115; 525/437; 525/449; 524/81
[58] Field of Search ............... 528/272, 279, 295, 297, 528/298, 302, 308, 308.6, 88, 97, 99, 103, 112, 115; 525/437, 449; 524/81

[56] References Cited

U.S. PATENT DOCUMENTS 4,390,493 6/1983 Yasui et al. ................. 264/328.16

FOREIGN PATENT DOCUMENTS 0030417 6/1981 European Pat. Off. .
0154065 9/1985 European Pat. Off. .
0390489 10/1990 European Pat. Off. .
2078240A 1/1982 United Kingdom .

OTHER PUBLICATIONS

Makromolekulare Chemie, Macromolecular Chemistry and Physics, vol. 187, No. 10, 1986, Basel CH, pp. 2387-2400, Mariano Pracella, the whole document.

*Primary Examiner*—Samuel A. Acquah
*Attorney, Agent, or Firm*—Nixon & Vanderhye

[57] ABSTRACT

Polyester resins are prepared by reacting a lower alkyl ester of an aromatic dicarboxylic acid with an aliphatic diol to form an aromatic polyester, and which includes (i) subjecting to transesterification reaction conditions in the presence of a titanium compound catalyst a transesterification reaction system having the lower alkyl ester of the aromatic dicarboxylic acid, the aliphatic and between 0.02 to 5.0 mole percent, based on the amount of the lower alkyl ester of the aromatic dicarboxylic acid, of an aromatic sulfonic acid compound represented by the following general formula (I):

$$OH-R-O-Ar-SO_3M \quad (I)$$

wherein Ar is a p-substituted benzene group or a 2,6-substituted naphthalene group, R is a divalent group selected from among $-CH_2CH(CH_3)-$, $-CH(CH_3)CH_2-$, $-CH_2CH(CH_3)-$ and $-CH_2CH_2OCH_2CH_2-$, and M is an alkali metal selected from the group consisting of lithium, sodium and potassium. The resulting transesterification reaction product is thereafter subjected to polycondensation to obtain the polyester resin. The polyester resin may be blended with an aromatic polyester base resin to yield a moldable polyester resin composition having exceptional crystallization rates.

9 Claims, No Drawings

PROCESS FOR PREPARING POLYESTER RESIN AND THE POLYESTER RESIN THEREBY PREPARED

FIELD OF INVENTION

The present invention relates to a process for preparing a polyester resin, the polyester resin thereby obtained, and to polyester compositions which include such polyester resin. The polyester resin of this invention exhibits excellent molding processability and mechanical properties as well as improved crystallization rates.

BACKGROUND AND SUMMARY OF THE INVENTION

Aromatic polyesters represented by polybutylene terephthalate (PBT) exhibit excellent heat resistance, chemical resistance and mechanical strength properties and are thereby used widely as engineering plastics. PBT itself has a rate of crystallization sufficiently high to permit it to be injection molded. However, further increases in the crystallization rate for PBT (thereby decreasing the molding cycle times, and increasing productivity) is desireable.

Copolyesters prepared by incorporating other comonomers into PBT or polybutylene naphthalate (PBN) generally exhibit remarkably low rates of crystallization because the comonomer acts as a crystallization inhibitor. However, such copolyesters typically exhibit poor moldability and mechanical strength properties. Furthermore, these copolyesters are problematic due to the propensity of the resin pellets to stick to one another during preparation. Other homopolyesters such as polyethylene terephthalate (PET), polypropylene terephthalate (PPT) and polyethylene naphthalate (PEN) have a low rate of crystallization in and of themselves, but are unsatisfactory in terms of their processability during molding, as well as their heat resistance and mechanical strength properties.

Many proposals have been made in an effort to enhance the crystallization rate of aromatic polyesters, including the addition of a crystallization accelerator. For example, the separate additions of (i) glass fibers (e.g. as disclosed in Japanese Patent Publication No. 18768/1970), (ii) an insoluble solid inorganic substance having a specified particle size (e.g. as disclosed in Japanese Patent Publication No. 9470/1970), and (iii) an ionic polyolefin copolymer (e.g., as disclosed in Japanese Patent Publication No. 26225/1970) have been suggested as crystallization accelerators for polyester resins. However, these crystallization accelerators cannot homogeneously be dispersed in polyester resins by melt-kneading techniques due to their poor solubility characteristics. Thus, the crystallization-accelerating effects of these conventional additives are still insufficient, particularly for copolyesters which are prepared using numerous comonomers. Adding increased amounts of such accelerators in an attempt to further accelerate the crystallization rate of a polyester resin is also impractical, because it significantly impairs the mechanical strength of the resin.

Another proposal to enhance the crystallization rate of polyester resins is to add an alkali metal salt of an aromatic sulfonic acid as disclosed in Japanese Patent Publication No. 56180/1985. Such an additive, however, is incompatible with the resin and thus does exhibit a sufficient crystallization-accelerating effect (even though it is superior to inactive powders in terms of dispersibility). It is further known that the high-melting polyester resin disclosed in Japanese Patent Laid-Open No. 149942/1983 has a relatively poor crystallization-accelerating effect, even though it is highly compatible with polyester resins. As described above, however, aromatic polyesters are typically not thought to exhibit satisfactory crystallization rates.

The present invention therefore, is broadly directed towards providing a polyester which exhibits excellent performance characteristics and towards processes for preparing the same. More specifically, the present invention is directed towards an aromatic polyester having a remarkably enhanced rate of crystallization as well as excellent mold-processability and mechanical strength properties which can be achieved by conducting transesterification in the presence of a specified monofunctional compound using a titanium compound as a catalyst, and then polycondensing the transesterification product.

The present invention, in preferred embodiments, relates to a process for preparing a polyester (and the polyester thereby prepared) by reacting a lower alkyl ester of an aromatic dicarboxylic acid with an aliphatic diol to form an aromatic polyester, whereby the transesterification of the lower alkyl ester with the diol is conducted in the presence of between 0.02 to 5.0 mole %, preferably between 0.02 to 1.80 mole %, and most preferably between 0.1 to 5.0 mole %, based on the lower alkyl ester of an aromatic dicarboxylic acid, of an aromatic sulfonic acid compound represented by the following general formula (I) using a titanium compound as a catalyst:

$$HO-R-O-Ar-SO_3M \qquad (I)$$

wherein —AR— is a p-substituted benzene group or a 2,6-substituted naphthalene group; R is a divalent group selected from among —$CH_2CH_2$, —$CH(CH_3)CH_2$—, —$CH_2CH(CH_3)$— and $CH_2CH_2OCH_2CH_2$—; and M is an alkali metal selected from among lithium, sodium and potassium.

The transesterified product is thereafter subjected to polycondensation conditions so as to obtain the aromatic polyester resin according to the present invention. When employed as a component in a blend (alloy) which includes a polyester base resin, the aromatic polyester resin according to the present invention serves as a useful crystallization rate accelerator when used, for example, in amounts between 1 to 100 parts by weight.

Further aspects and advantages of this invention will become more clear after careful consideration is given to the detailed description of the preferred exemplary embodiments thereof which follows.

DETAILED DESCRIPTION OF THE PREFERRED EXEMPLARY EMBODIMENTS

As noted briefly above, the aromatic polyester of the present invention is one prepared by conducting transesterification of the lower alkyl ester of an aromatic dicarboxylic acid with an aliphatic diol in the presence of a specified amount of the compound represented by the formula (I) using a titanium compound as a catalyst and thereafter polycondensing the transesterification product. The aromatic polyester of this invention thus includes not only homopolyesters but also copolyesters composed of several types of ester units.

The lower alkyl ester of an aromatic dicarboxylic acid is selected mainly from among dimethyl terephthalate, dimethyl 2,6-naphthalenedicarboxylate and dimethyl 2,7-naphthalenedicarboxylate. Such an ester is preferably used in an amount of 60 mole % or above, and more preferably 70 mole % or above based on the entire amount of the acid component constituting the polyester. On the other hand, the aliphatic diol is selected mainly from among ethylene glycol, 1,3-propanediol and 1,4-propanediol. Such a diol is preferably used in an amount of 60 mole % or above, preferably 70 mole % or above, based on the entire amount of the diol component constituting the polyester.

Examples of the main repeating unit of the polyester according to the present invention include ethylene terephthalate, ethylene 2,6-naphthalate, ethylene 2,7-naphthalate, propylene terephthalate, propylene 2,6-naphthalate, propylene 2,7-naphthalate, butylene terephthalate, butylene 2,6-naphthalate and butylene 2,7-naphthalate. Particularly, polyesters mainly comprising ethylene terephthalate, propylene terephthalate, butylene terephthalate, ethylene 2,6-naphthalate, propylene 2,6-naphthalate or butylene 2,6-naphthalate units are preferred.

During preparation of the copolyester according to the present invention, it is of course possible to use two or more acid components selected from among those described above. Further, it is possible to use one or more comonomers selected from among known lower alkyl esters of difunctional carboxylic acid such as dimethyl diphenate, dimethyl 4,4′-diphenyldicarboxylate, dimethyl adipate, dimethyl sebacate or dimethyl 1,4-cyclohexanedicarboxylate. On the other hand, the diol component that may be used include, of course, those described above, as well as one or more other known difunctional diols such as diethylene glycol, triethylene glycol, 1,5-pentanediol, 1,6-hexanediol, neopenyl glycol, 1,10-decanediol, 1,4-cyclohexanedimethanol, 1,4-cyclohexanediol, p-xylylene glycol, adduct of hydroquinone with ethylene oxide, adduct of 2,2-bis(4-hydroxyphenyl) propane with ethylene oxide, adduct of bis(4-hydroxyphenyl)sulfone with ethylene oxide, adduct of 2,2-bis(3,5-dibromo-4-hydroxyphenyl)propane with ethylene oxide or adduct of 2,6-dihydroxynaphthalene with ethylene oxide. Furthermore, an at least trifunctional compound such as trimethyl trimesate, trimethyl trimellitate, trimethylolpropane or pentaerythritol, a monofunctional compound such as stearyl alcohol or methyl o-benzoylbenzoate, a hydroxy carboxylic acid derivative such as methyl p-hydroxyethoxyphenylcarboxylate and/or a polyalkylene glycol such as polybutylene glycol may be used as additional components.

The present invention is especially characterized by adding a specified amount of an aromatic sulfonic acid compound represented by the following general formula (I) to the transesterification system as another starting material for the preparation of the polyester:

HO—R—O—Ar—SO₃M      (I)

wherein —Ar— is a p-substituted benzene group or a 2,6-substituted naphthalene group; R is a divalent group selected from among —CH₂CH₂, —CH(CH₃)CH₂—, —CH₂CH(CH₃)— and —CH₂CH₂OCH₂CH₂—; and M is an alkali metal selected from lithium, sodium and potassium.

Specific examples of the compounds represented by the formula (I) include the following adducts: sodium p-phenolsulfonate with one ethylene oxide molecule, sodium p-phenelsulfonate with one propylene oxide molecule, sodium p-phenolsulfonate with two ethylene oxide molecules, lithium p-phenolsulfonate with one ethylene oxide molecule, potasssium p-phenolsulfonate with one ethylene oxide molecule, sodium 2-naphthol-6-sulfonate with one ethylene oxide molecule, sodium 2-naphtol-6-sulfonate with one propylene oxide molecule, sodium 2-naphthol-6-sulfonate with two ethylene oxide molecules, and lithium 2-naphthol-6-sulfonate with one ethylene oxide molecule.

Aromatic sulfonic acid compounds represented by the general formula (I) wherein —AR— is a benzene ring substituted with a sulfonate group (—SO₃M) and an ester forming functional group (HO—R—O) at relative positions other than the p-positions or a naphthalene ring substituted therewith at relative positions other than the 2,6-positions (for example, an adduct of sodium m-phenolsulfonate with one ethylene oxide molecule, an adduct of sodium 1-naphthol-2-sulfonate with one ethylene oxide molecule, an adduct of sodium 1-naphthol-4-sulfonate with one ethylene oxide molecule and adduct of sodium 1-naphthol-7-sulfonate with one ethylene oxide molecule) are not sufficiently effective in accelerating the crystallization of a polyester, as will be described further in connection with the Comparative Examples. The reason why such compounds are ineffective as compared to the compounds employed in the practice of the present invention is thought to be that the position of the ionic group (—SO₃M) bonded to the end of the backbone chain may have an influence upon the motion of the backbone chain. Furthermore, aromatic sulfonic acid compounds having two or more reactive functional groups, such as an adduct of sodium 1,4-diphenyl-2-sulfonate with ethylene oxide, are undesirable, because an efficient introduction of the compound to the end of the backbone chain is too difficult to attain a sufficient crystallization-accelerating effect as will be described in the Comparative Examples and thus runs counter to the intent of the present invention.

It is preferable that the compound represented by the general formula (I) be used in an amount between 0.02 to 1.80 mole %, particularly preferably 0.05 to 1.50 mole % based on the lower alkyl ester of the aromatic dicarboxylic acid (the same applies hereinafter). When the amount is less than 0.02 mole %, the resulting polyester will not exhibit sufficiently improved crystallization rates. However, when it exceeds 1.80 mole %, the resulting polyester will have a low degree of polymerization and also exhibit poor mechanical strength properties. Accordingly, both such cases are unfavorable. It has been confirmed that the compound represented by the formula (I) is minimally distilled from the reaction system during transesterification and subsequent polycondensation. Thus, substantially all of the compound represented by formula (I) that is used in transesterification ultimately is introduced into the formed polymer.

Preferably, the aromatic sulfonic acid compound represented by the general formula (I) is added to the reaction system together with the other starting materials of the polyester and a titanium compound (which will be described below) prior to the initiation of transesterification or at least during an initial stage thereof.

Specifically, the compound represented by formula (I) is added to the reaction mixture before 90% of the theoretical amount of the lower alcohol formed by the transesterification is distilled out of the reaction system. It is particularly preferred that it be added to the reaction system prior to transesterification initiation—i.e., when the amount of the lower alcohol that is distilled out is nearly zero. The term "theoretical amount" used in this specification refers to the amount of the lower alcohol calculated based on the total amount of the lower alkyl ester(s) of carboxylic acid(s) used. When the aromatic sulfonic acid compound represented by the general formula (I) is added in a final stage of the transesterification (i.e., at the point in time whereby the amount of the lower alcohol distilled out has reached 90% by weight or more of the theoretical amount) or during the course of the polycondensation, the resulting polyester will not have a sufficiently high rate of crystallization. Furthermore, late addition of the compound of formula (I) will result in an undissolved part of the aromatic sulfonic compound being dispersed heterogeneously throughout the resin. This uneven distribution in turn results in an uneven crystallization rate and thus molded articles having impaired appearance due to the compound being crystallized on the article surface in the form of small particles are obtained.

The present invention is also especially characterized by using a titanium compound as a catalyst. Examples of preferred titanium compounds include titanium tetrabutoxide, titanium tetrapropoxide, titanium tetraethoxide, titanium isopropoxyoctylene glycol, titanium butoxyoctylene glycol, titanium isopropoxybutylene glycol, titanium dihydroxybislactate, titanium diisopropoxybisacetylacetonate, titanium dibutoxybistriethanolaminate and titanium isopropoxytriisostearate. Among these, titanium tetraalkoxides, such as titanium tetrabutoxide, titanium tetrapropoxide and titanium tetraethoxide are particularly preferred.

The polyester resin of the present invention can be prepared by subjecting the transesterification product to conventional polycondensation conditions. The resin thus obtained may also thereafter be subjected to solid phase polymerization either under a reduced pressure or in the presence of an inert gas to convert it into a product having a higher degree of polymerization.

According to the process of the present invention, a predetermined amount of a residue of the aromatic sulfonic acid compound can be efficiently bonded to the terminal ends of the backbone chain of the polyester resin, by which a polyester having an improved crystallization rate can be obtained without lowering its degree of polymerization.

Depending on the desired functionality, one or more members selected from among other thermoplastic resins, additives, organic and inorganic fillers, and the like many optionally be added to the polyester of the present invention.

The polyester resin prepared by the process of the present invention has an improved crystallization rate and exhibits excellent processability during injection molding (particularly in terms of short mold cycle times) and gives a molded article having excellent mechanical strength and heat resistance properties. Thus, the polyester resin of the present invention is very useful as a molding material.

The present invention also provides an aromatic polyester comprising 1,4-butylene terephthalate or 1,4-butylene-2,6-naphthalate as a main repeating unit and between 0.1 to 5.0 mole % (based on the total of all repeating ester units) of a residue of the aforementioned aromatic sulfonic acid compound which is bonded to the terminal end of the backbone chain of the polyester through ester linkage.

The present invention may be embodied in a polyester resin composition prepared by blending (A) 100 parts by weight of an aromatic polyester resin mainly comprising alkylene terephthalate or alkylene naphthalate repeating units with (B) between 1 to 100 parts by weight of an aromatic polyester resin comprising 1,4-butylene terephthalate or 1,4-butylene-2,6-naphthalate as a main repeating unit and 0.1 to 5.0 mole % (based on all the repeating ester units) of a residue of the aforementioned aromatic sulfonic acid compound which is bonded to the end of the backbone chain of the resin through ester linkage.

The aromatic polyester component (B) is a polyester which contains a specified metal sulfonate group bonded to the end and the main repeating unit of which is 1,4-butylene terephthalate or 1,4-butylene 2,6-naphthalate. From the standpoint of maintaining crystallinity, it is preferred that such a main repeating unit be present in an amount of 80 mole % or above, particularly preferably 90 mole % or above based on all the ester units constituting the aromatic polyester component (B). These constituent units can be formed by polycondensing a lower alkyl ester of an aromatic dicarboxylic acid, such as dialkyl terephthalate or dialkyl 2,6-naphthalenedicarboxylate, with 1,4-butanediol. Further, the copolyester to be used as the component (B) can be prepared by using an acid component other than the main acid component described above and/or a diol component other than the main diol component described above as additional components.

The amount of the residue of the aromatic sulfonic acid compound represented by the general formula (I) bonded to the terminal end of the backbone chain must be between 0.1 to 5.0 mole %, and more preferably between 0.2 to 3.0 mole %, based on the amount of all repeating ester units. When the amount is less than 0.1 mole %, the resulting polyester composition will not exhibit sufficient improvements in terms of crystallization rates. On the other hand, when it exceeds 5.0 mole %, the resulting polyester component (B) will have a low degree of polymerization and will be poorly compatible with the resin component (A). The resulting composition will thus exhibit poor mechanical strength. The amount of the residue can be determined by $^1$H-NMR spectrometry which will be described below.

The polyester component (B) is preferably one prepared by a process which comprises conducting the transesterification of other ester-forming monomers in the presence of a well-known catalyst and then polycondensing the transesterification product, wherein an aromatic sulfonic acid compound represented by the general formula (I) is added to the reaction system in an initial stage of the transesterification. It is particularly preferable that the compound be added to the reaction system prior to the initiation of the transesterification. The polyester component (B) according to the present invention can be prepared from the transesterification product using conventional polycondensation conditions. Furthermore, the resin thus prepared may be subjected to solid phase polymerization either under a reduced pressure or in the presence of an inert gas to enhance the degree of polymerization.

The polyester resin composition of the present invention can be prepared by blending 100 parts by weight of the aromatic polyester resin (A) with between 1 to 100 parts by weight of the aromatic polyester resin component (B) containing a residue of the sulfonic aromatic sulfonic acid compound described above bonded to the terminal end of the polyester's backbone chain. When the amount of the polyester component (B) is less than one part by weight, the resulting polyester resin composition will not exhibit sufficient improvements in terms of crystallization notes. On the other hand, when component (B) exceeds 100 parts by weight, the various characteristics inherent in the resin component (A) will be unfavorably affected.

It is particularly preferred that the amount of the polyester component (B) be between 5 to 80 parts by weight per 100 parts by weight of the component (A). The suitable amounts of the components (A) and (B) that may be blended, of course, vary depending upon the amount of the sulfonic acid compound that is introduced into the component (B). When a smaller amount of the sulfonic acid compound is introduced into the component (B), the use of a relatively larger amount of the component (B) is thus preferable, because it brings about a higher crystallization-accelerating effect with little adverse effect on other properties. On the other hand, when a relatively larger amount of the sulfonic acid compound is introduced into the component (B), a sufficient crystallization-accelerating effect can be attained even by the use of a small amount of the component (B), while the use of a large amount of the component (B) exerts an adverse effect on other properties unfavorably.

The composition of the present invention can be prepared by conventional melt kneading process techniques using an extruder by adding the polyester component (B) during the polymerization phase of polyester (A). Alternately, pellets of the resin components (A) and (B) may mechanically be blended together on a tumbler or blender and then directly subjected to molding. The melt kneading process is, however, preferable.

The polyester resin composition of the present invention thus prepared has a significant crystallization-accelerating effect and exhibits excellent molding processability and mechanical strength.

The polyester composition of the present invention may further contain, as auxiliary components, one or more members selected from among other thermoplastic resins, additives and organic and inorganic fillers as may be desired provided that the crystallization-promoting effects of the present invention are not deleteriously affected. The thermoplastic resins may include polyacetal, polystyrenic resin, polycarbonate, polyarylene oxide, polyarylene sulfide and fluororesin; the additives may include well-known stabilizers such as ultraviolet absorbers and antioxidants, antistatic agents, flame retardants, auxiliary flame retardants, coloring agents such as dyes and pigments, lubricants, plasticizers, slip additives and mold release agents; the inorganic fillers include glass fibers, milled glass fibers, glass beads, silica, alumina fibers, zirconia fibers, potassium titanate fibers, carbon black, graphite, calcium silicate, aluminum silicates, kaolin, talc, clay, iron oxide, titanium oxide, zinc oxide, antimony oxide, alumina, silicon carbide, silicon nitride and boron nitride; and the organic fillers include high-melting fibers of polyester, aromatic polyamide, polyimide and fluororesin. These fillers may further be surface treated with an epoxy, isocyanate or silane compound.

The polyester resin composition of the present invention exhibits improved crystallization rates, and excellent injection molding processability. The resin thus provides for molded articles with exceptional mechanical strength and heat resistance properties.

EXAMPLES

The present invention will now be described more specifically by referring to the following non-limiting Examples.

Example 1

306.5 parts by weight of dimethyl terephthalate, 283.1 parts by weight of 1,4-butanediol, 3.8 parts by weight (1.0 mole %) of adduct (I-a) of sodium p-phenolsulfonate with one ethylene oxide molecule and a predetermined amount of titanium tetrabutoxide were fed into a reactor filled with a stirrer and a distilling tube. The air in the resulting system was sufficiently purged with nitrogen and the stirring of the contents was started. The temperature of the contents was raised to 160° C. under normal pressure. While raising the temperature gradually, the methanol formed as a by-product was distilled out. At the point of time at which the amount of the methanol distilled out exceeded 90% by weight of the theoretical amount, the temperature reached 240° C. From this point of time, the reactor was gradually evacuated and the contents were stirred under a pressure of 0.1 Torr for 2.5 hours to give a polyester resin. This polyester resin had an intrinsic viscosity Of 0.77 as determined in o-chlorophenol at 25° C. The degree of introduction of the adduct of sodium p-phenolsulfonate with one ethylene oxide molecule to the polymer was 1.0 mole % as determined by $^1$H-NMR spectroscopy using trifluoroacetic acid-d as a solvent and X-ray fluorescence spectrometry. The pelletized resin thus obtained was sufficiently dried and evaluated for crystallization characteristics. The results are given in Table 1.

In the Table, Tm represents the melting peak temperature of each polyester as determined according to JIS K 7121 at a temperature rise rate of 10° C./min., and $T_c$ the crystallization peak temperature thereof as determined according to JIS K 7121 at a temperature drop rate of 10° C./min. The $(T_m - T_c)$ value calculated from these temperatures serves as an indication of the rate of crystallization. A smaller $(T_m - T_c)$ value means a higher degree of acceleration of crystallization. Further, $X_c$ is a value calculated by the formula: $2\Delta H/Y$, wherein Y represents the crystallization peak height of each polyester as determined according to JIS K 7121 and ΔH represents the heat of crystallization thereof as determined according to JIS K 7122. A smaller $X_c$ value is indicative of greater crystallization acceleration.

Comparative Example 1

A PBT homopolymer was prepared in the same manner as Example 1 except that no compound represented by the formula (I) was added. The crystallization characteristics thereof are given in Table 1.

Example 2 to 4 and Comparative Examples 2 to 5

Polyester resins were prepared in the same manner as Example 1 except that the adduct (I-a) of sodium p-phenolsulfonate with one ethylene oxide molecule was replaced by a predetermined amount (1.0 mole %) of adduct (I-b) of sodium p-phenolsulfonate with one propylene oxide molecule, adduct (I-c) of sodium p-phenolsulfonate with two ethylene oxide molecules, adduct (I-d) of sodium 2-naphthol-6-sulfonate with one ethylene oxide molecule, sodium salt (I'-1) of methyl m-sulfobenzoate, adduct (I'-2) of sodium 1,4-dephenyl-2-sulfonate with two ethylene oxide molecules, adduct (I'-3) of sodium m-phenolsulfonate with one ethylene oxide molecule or adduct (I'-4) of sodium 1-naphthol-2-sulfonate with one ethylene oxide molecule, the last four compounds being used for comparison. The degrees of introduction of the compounds were all 1.0 mole %. The crystallization characteristics of the polyester resins are given in Table 1.

Comparative Example 6

100 parts by weight of the PBT homopolymer prepared in the Comparative Example 1 and 0.1 part by weight of powdered boron nitride (BN) (a product of Denki Kagaku Kogyo K.K.) as a nuclear agent for crystallization were melt-kneaded together on a twin-screw extruder having an inner diameter of 30 mm and fitted with a screw feeder and a vent at a cylinder temperature of 260° C. to give a pelletized resin composition. The crystallization characteristics of the composition are given in Table 1.

It can be understood from the results given in Table 1 that the crystallization of the polyester resin prepared by using the aromatic sulfonic acid compound of formula (I) represented by the adduct (I-a) of sodium p-phenolsulfonate with one ethylene oxide molecule is efficiently accelerated, while the crystallization of the polyester prepared by using an aromatic sulfonic acid compound deviating from the definition of the present invention in respect of the position of substitution or a multifunctional aromatic sulfonic acid compound is not accelerated.

Comparative Example 7

306.5 parts by weight of dimethyl terephthalate, 283.1 parts by weight of 1,4-butanediol and a predetermined amount of titanium tetrabutoxide were fed into a reactor fitted with a stirrer and a distilling tube. The air in the resulting system was purged with nitrogen sufficiently and the stirring of the contents was started. The temperature of the contents was raised to 160° C. under normal pressure. While raising the temperature gradually, the methanol formed as a by-product was distilled out. At the point of time at which the amount of the methanol distilled out exceeded 92% by weight of the theoretical amount, 3.8 parts by weight (1.0 mole %) of the adduct (I-a) of sodium p-phenolsulfonate with one ethylene oxide molecule was added to the reactor and the temperature of the contents was raised to 240° C. the reactor was gradually evacuated and the contents were stirred under a pressure of 0.1 Torr for 2.5 hours to give a polyester resin. The crystallization characteristics of the resin are given in Table 2.

Comparative Example 8

306.5 parts by weight of dimethyl terephthalate, 283.1 parts by weight of 1,4-butanediol and a predetermined amount of titanium tetrabutoxide were fed into a reactor fitted with a stirrer and a distilling tube. The air in the resulting system was purged with nitrogen sufficiently and the stirring of the contents was started. The temperature of the contents was raised to 160° C. under normal pressure. While raising the temperature gradually, the methanol formed as a by-product was distilled out. At the point of time at which the amount of the methanol distilled out exceeded 90% by weight of the theoretical amount, the temperature reached 240° C. From this point of time, the reactor was gradually evacuated and the contents were stirred under a pressure of 0.1 Torr for 2.0 hours, followed by the addition of 3.8 parts by weight (1.0 mole %) of the adduct (I-a) of sodium p-phenolsulfonate with one ethylene oxide molecule. The resulting mixture was further stirred for 0.5 hours to give a polyester resin. The crystallization characteristics of the resin are given in Table 2.

Comparative Example 9

700 parts by weight of the PBT homopolyester prepared in the Comparative Example 1 and 7.6 parts by weight (1.0 mole % based on the ester units constituting the polyester) of the adduct (I-a) of sodium p-phenolsulfonate with one ethylene oxide molecule were melt-kneaded together on the same twin-screw extruder as the one used in the Comparative Example 6 at a cylinder temperature of 260° C. to give a pelletized resin composition. The crystallization characteristics of the composition are given in Table 2.

Comparative Example 10

700 parts by weight of the PBT homopolyester prepared in the Comparative Example 1 and 7.6 parts by weight of sodium benzenesulfonate were melt-kneaded together on a twin-screw extruder at a cylinder temperature of 260° C. to give a pelletized resin composition. The crystallization characteristics of the composition are given in Table 2.

It can be understood from the results given in Table 2 that the polyester resin prepared by adding the aromatic sulfonic acid compound represented by the adduct (I-a) or sodium p-phenolsulfonate with one ethylene oxide molecule to the reaction system in an initial stage of the transesterification, i.e., before the amount of the alcohol distilled out reaches 90% by weight of the theoretical amount exhibits a particularly excellent crystallization-accelerating effect. Further, as understood from the results of the Comparative Examples 9 and 10, the polyester resin composition prepared by melt-kneading a polyester together with the adduct (I-a) of sodium p-phenolsulfonate with one ethylene oxide molecule exhibits only a crystallization-accelerating effect equivalent to that of the resin composition prepared by melt-kneading a polyester together with sodium benzenesulfonate having no ester-forming functional group. This fact means that the bonding of the adduct to the end of the polyester molecule hardly occurs in the Comparative Example 9, which is a reason why the composition of the Comparative Example 9 exhibits only a poor crystallization-accelerating effect. Further, fine deposits of undissolved aromatic sulfonic acid compound were observed on the surface of the resin pellets prepared in the Comparative Examples 9 and 10.

Examples 5 to 7

Polyester resins were prepared in the same manner as that of Example 1 except that the amount of the adduct (I-a) of sodium p-phenolsulfonate with one ethylene oxide molecule to be used was varied. The obtained resins were evaluated for crystallization characteristics. Further, the resins were each injection molded into a test piece for tensile test by a conventional process and the mechanical strength (tensile strength) thereof was determined according to ASTM D 638. The results are given in Table 3.

Comparative Examples 11 and 12

Polyester resins were prepared in the same manner as that of Example 1 except that the amount of the adduct (I-a) of sodium p-phenolsulfonate with one ethylene oxide molecule to be used was varied. The obtained pelletized resins were sufficiently dried and evaluated for crystallization characteristics. Further, they were each injection molded into a test piece for tensile test by a conventional process and the mechanical strength (tensile strength) thereof was determined according to ASTM D 638. The results are given in Table 3.

It can be understood from the results given in Table 3 that when the amount of the adduct (I-a) of sodium p-phenolsulfonate with one ethylene oxide molecule is less than 0.02 mole %, little crystallization-accelerating effect is attained, while when it exceeds 1.80 mole %, the mechanical strength is remarkably lowered.

Examples 8 and 9

246.0 parts by weight of dimethyl terephthalate, 61.5 parts by weight of dimethyl isophthalate, 284.5 parts by weight of 1,4-butanediol, 1.9 parts by weight (0.05 mole %) or 3.8 parts by weight (1.0 mole %) of the adduct (I-a) of sodium p-phenolsulfonate with one ethylene oxide molecule and a predetermined amount of titanium tetrabutoxide were fed into a reactor fitted with a stirrer and a distilling tube. The resulting system was sufficiently purged with nitrogen and the stirring of the contents was started. The temperature of the contents was raised to 160° C. While raising the temperature gradually, the methanol formed as a by-product was distilled out. At the point of time at which the amount of the methanol distilled out exceeds 90% by weight of the theoretical amount, the temperature reached 235° C. From this point of time, the reactor was gradually evacuated and the contents were stirred under a pressure of 0.1 Torr for 3.0 hours to give a polyester resin. The polyester resins thus prepared had an intrinsic viscosity of 0.75 as determined in o-chlorophenol at 25° C. The degrees of introduction of the adduct of sodium p-phenolsulfonate with one ethylene oxide molecule into the resins were 0.5 mole % and 1.0 mole %. The obtained pelletized resins were dried sufficiently and evaluated for crystallization characteristics. The results are given in Table 4. The amount of the dimethylisophthalate residues introduced was determined by $^1$H-NMR spectroscopy using trifluoroacetic acid-d as a solvent.

Comparative Example 13

A copolyester resin was prepared in the same manner as that of the Example 8 except that no adduct of sodium p-phenolsulfonate with one ethylene oxide molecule was used. The crystallization characteristics thereof are given in Table 4.

Comparative Examples 14 and 15

The polyester resin prepared in the Preparative Example 13 and a predetermined amount of powdered boron nitride (BN) were melt-kneaded together on a twin-screw extruder at a cylinder temperature of 235° C. to give a pelletized resin composition. The crystallization characteristics thereof are given in Table 4.

It can be understood from the results given in Table 4 and those of the Comparative Examples 1 and 6 that a copolyester containing the aromatic sulfonic acid compound of the formula (I) introduced thereinto by the specified process sufficiently retains the crystallization-accelerating effect due to the presence of such compound, while a copolyester containing powdered boron nitride (BN) loses much of the crystallization-accelerating effect.

Example 10 and Comparative Example 16

329.6 parts by weight of dimethyl terephthalate, 258.3 parts by weight of 1,3-propanediol, 1.9 parts by weight (0.5 mole %) of the adduct (I-a) of sodium p-phenolsulfonate with one ethylene oxide molecule and a predetermined amount of titanium tetrabutoxide were fed into a reactor fitted with a stirrer and a distilling tube. The air in the resulting system was sufficiently purged with nitrogen and the stirring of the contents was started. The temperature of the contents was raised to 175° C. under normal pressure. While raising the temperature gradually, the methanol formed as a by-pridcut was distilled out. At the point of time at which the amount of the methanol distilled out exceeded 90% by weight of the theoretical amount, the temperature reached 250° C. From this point of time, the reactor was gradually evacuated and the contents were stirred under a pressure of 0.1 Torr for 3.0 hours to give a polyester resin. This polyester resin had an instrinsic viscosity of 0.66 as determined in o-chlorophenol at 25° C. The degree of introduction of the adduct of sodium p-phenolsulfonate with one ethylene oxide molecule was 0.5 mole %. The obtained pelletized resin was sufficiently dried and evaluated for crystallization characteristics. Another PPT homopolyester was prepared in the same manner as that described above except that no adduct was used. The results are given in Table 5.

Example 11 and Comparative Example 17

334.9 parts by weight of dimethyl terephthalate, 247.7 parts by weight of ethylene glycol, 2.1 parts by weight (0.5 mole %) of the adduct (I-a) of sodium p-phenolsulfonate with one ethylene oxide molecule and a predetermined amount of titanium tetrabutoxide were fed into a reactor fitted with a stirrer and a distilling tube. The air in the resulting system was sufficiently purged with nitrogen and the stirring of the contents was started. The temperature of the contents was raised to 185° C. under normal pressure. While raising the temperature gradually, the methanol formed as a by-product was distilled out. The temperature was raised to 270° C. and from this point of time, the reactor was evacuated gradually. The contents were stirred under a pressure of 0.1 Torr for 2.5 hours to give a polyester resin. This polyester resin had an intrinsic viscosity of 0.67 as determined in o-chlorophenol at 25° C. The degree of introduction of the adduct was 0.5 mol %. The obtained pelletized resin was sufficiently dried and evaluated for crystallization characteristics. For comparison, another PET homopolyester was prepared in the same manner as that described above except that no adduct was used. The results are given in Table 5.

As understood from the results given in Table 5, various polyesters can be remarkably improved in crystallization characteristics by introducing a specified amount of the aromatic sulfonic acid compound represented by the adduct of sodium p-phenolsulfonate with one ethylene oxide molecule thereinto by the process specified in the present invention.

Comparative Example 18

334.9 parts by weight of dimethyl terephthalate, 247.7 parts by weight of ethylene glycol, 2.1 parts by weight (0.5 mole %) of the adduct (I-a) of sodium p-phenolsulfonate with one ethylene oxide molecule and a predetermined amount of calcium acetate were fed into a reactor fitted with a stirrer and a distilling tube. The air in the resulting system was purged with nitrogen sufficiently and the stirring of the contents was started. The temperature of the contents was raised to 185° C. under normal pressure. While further raising the temperature gradually, the methanol formed as a by-product was distilled out. At this point of time at which the amount of the methanol distilled out exceeded 90% by weight of the theoretical amount, a predetermined amount of antimony trioxide was added and the temperature was raised to 270° C. From this point of time, the reactor was gradually evacuated and the contents were stirred under a pressure of 0.1 Torr for 3.5 hours to give a polyester resin. This resin had an intrinsic viscosity of 0.68 as determined in o-chlorophenol at 25° C. The obtained pelletized resin was sufficiently dried and evaluated for crystallization characteristics. The results are given in Table 5. It can be understood from the results that when no titanium compound was used as a catalyst, the resulting polyester has an insufficient crystallization-accelerating effect.

TABLE 1

| | Aromatic sulfonic acid compound | $T_m$ (°C.) | $T_m-T_c$ (°C.) | $X_c$ (sec) | Intrinsic viscosity |
|---|---|---|---|---|---|
| Ex. 1 | 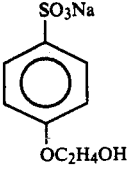 (I-a) | 223.5 | 24.4 | 28.6 | 0.77 |
| Ex. 2 | 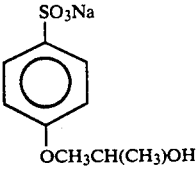 (I-b) | 222.0 | 25.7 | 32.4 | 0.79 |
| Ex. 3 | 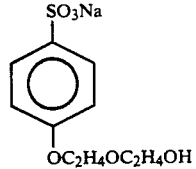 (I-c) | 222.8 | 26.0 | 35.7 | 0.76 |
| Ex. 4 | 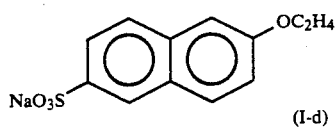 (I-d) | 223.6 | 25.9 | 34.4 | 0.75 |
| Comp. Ex. 1 | — | 221.3 | 35.2 | 103.4 | 0.78 |
| Comp. Ex. 2 | 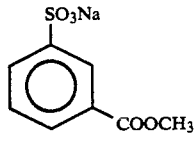 (I'-1) | 223.1 | 30.8 | 72.1 | 0.75 |
| Comp. Ex. 3 | 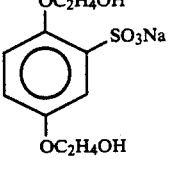 (I'-2) | 218.0 | 31.4 | 88.0 | 0.80 |
| Comp. Ex. 4 | 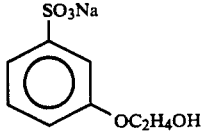 (I'-3) | 222.8 | 32.0 | 64.3 | 0.76 |

TABLE 1-continued

| | Aromatic sulfonic acid compound | $T_m$ (°C.) | $T_m - T_c$ (°C.) | $X_c$ (sec) | Intrinsic viscosity |
|---|---|---|---|---|---|
| Comp. Ex. 5 | (structure: naphthalene with OC$_2$H$_4$OH and SO$_3$Na substituents) (I'-4) | 222.2 | 31.3 | 67.9 | 0.76 |
| Comp. Ex. 6 | addition of 100 ppm of powdered boron nitride | 222.8 | 32.1 | 90.0 | 0.78 |

TABLE 2

| | Time of addition of aromatic sulfonic acid compound* | $T_m$ (°C.) | $T_m - T_c$ (°C.) | $X_c$ (sec) | Intrinsic viscosity |
|---|---|---|---|---|---|
| Ex. 1 | before the initiation of transesterification (amt. of methanol distilled out: 0) | 223.5 | 24.4 | 28.6 | 0.77 |
| Comp. Ex. 7 | in a final stage of transesterification (amt. of methanol distilled out: 92%) | 222.9 | 27.6 | 59.9 | 0.77 |
| Comp. Ex. 8 | in a final stage of polycondensation | 222.0 | 28.0 | 78.3 | 0.77 |
| Comp. Ex. 9 | in melt kneading on extruder | 221.5 | 28.3 | 87.5 | 0.78 |
| Comp. Ex. 10 | in melt kneading on extruder | 220.0 | 28.7 | 84.4 | 0.78 |

*Adduct of sodium p-phenolsulfonate with one ethylene oxide molecule was used in Example 1 and Comparative Examples 7 to 9, while sodium benzenesulfonate in Comparative Example 10.

TABLE 3

| | Amt. of aromatic sulfonic acid compound* used (mol %) | $T_m$ (°C.) | $T_m - T_c$ (°C.) | $X_c$ (sec) | Intrinsic viscosity | Tensile strength (kg/cm$^2$) |
|---|---|---|---|---|---|---|
| Ex. 6 | 1.5 | 223.5 | 24.2 | 27.2 | 0.76 | 560 |
| Ex. 1 | 1.0 | 223.5 | 24.4 | 28.6 | 0.77 | 590 |
| Ex. 5 | 0.5 | 222.8 | 25.0 | 31.6 | 0.77 | 598 |
| Ex. 7 | 0.05 | 222.0 | 27.0 | 51.3 | 0.78 | 600 |
| Comp. Ex. 11 | 0.01 | 221.9 | 32.8 | 72.2 | 0.78 | 600 |
| Comp. Ex. 12 | 2.0 | 223.7 | 24.0 | 25.0 | 0.75 | 475 |

*adduct of p-phenolsulfonic acid with one ethylene oxide molecule

TABLE 4

| | Degree of introduction of dimethyl isophthalate residue (mol %) | Amt. of aromatic sulfonic acid compound* used (mol %) | Amt. of boron nitride added (ppm) | $T_m$ (°C.) | $T_m - T_c$ (°C.) | $X_c$ (sec) | Intrinsic viscosity |
|---|---|---|---|---|---|---|---|
| Ex. 8 | 20 | 0.5 | 0 | 190.1 | 30.5 | 57.2 | 0.75 |
| Ex. 9 | 20 | 1.0 | 0 | 190.0 | 27.7 | 52.1 | 0.75 |
| Comp. Ex. 13 | 20 | 0 | 0 | 190.9 | 52.5 | 168.1 | 0.76 |
| Comp. Ex. 14 | 20 | 0 | 100 | 190.7 | 49.9 | 145.0 | 0.76 |
| Comp. Ex. 15 | 20 | 0 | 5000 | 190.5 | 36.5 | 107.8 | 0.76 |

*adduct of sodium p-phenolsulfonate wtih one ethylene oxide molecule

TABLE 5

| | Polyester composed of | Amt. of aromatic sulfonic acid compound* used (mol %) | $T_m$ (°C.) | $T_m - T_c$ (°C.) | $X_c$ (sec) | Intrinsic viscosity |
|---|---|---|---|---|---|---|
| Ex. 10 | 1,3-propylene terephthalate units | 0.5 | 229.9 | 27.4 | 61.5 | 0.66 |
| Ex. 11 | ethylene terephthalate units | 0.5 | 255.3 | 30.2 | 104.2 | 0.67 |
| Comp. Ex. 16 | 1,3-propylene terephthalate units | 0 | 228.7 | 55.1 | 151.2 | 0.67 |
| Comp. Ex. 17 | ethylene terephthalate units | 0 | 252.9 | 60.5 | 345.4 | 0.68 |
| Comp. Ex. 18 | ethylene terephthalate units** | 0.5 | 253.1 | 44.3 | 263.3 | 0.68 |

*adduct of sodium p-phenolsulfonate with one ethylene oxide molecule
**prepared by using calcium acetate and antimony trioxide as catalysts Example 12 (synthesis of polyester B-1)

306.5 parts by weight of dimethyl terephthalate, 282.2 parts by weight of 1,4-butanediol, 4.8 parts by weight of adduct (I-a) of sodium p-phenolsulfonate with one ethylene oxide molecule and a predetermined amount of titanium tetrabutoxide were fed into a reactor fitted with a stirrer and a distilling tube. The air in the resulting system was sufficiently purged with nitrogen. The stirring of the contents was started and the temperature thereof was raised to 160° C. under normal pressure.

While raising the temperature gradually, the methanol formed as a by-product was distilled out. At the point of time at which the temperature of the contents reached 240° C., the reactor was gradually evacuated and the contents were stirred under a pressure of 0.1 Torr for 2.5 hours to give a polyester resin. This polyester resin had an intrinsic viscosity of 0.76 as determined in o-chlorophenol at 25° C. The amount of a residue of the aromatic sulfonic acid compound bonded to the end of the backbone chain of the polyester resin was 1.3 mole % (based on all the repeating ester units) as determined by $^1$H-NMR spectrometry using trifluoroacetic acid-d as a solvent.

Examples 13 to 15 (synthesis of polyesters B-2, B-3 and B′4

Polyester resins were prepared in the same manner as that of Example 12 except that the amount of the adduct (I-a) to be added was varied. The amounts of a residue of the sulfonic acid compound (I-a) introduced into the resins (B-2), (B-3) and (B′-4) were 0.30, 3.0 and 7.5 mole %, respectively, based on all the repeating ester units.

Examples 16 and 17 (synthesis of polyesters B-5 and B′-6)

Polyester resins were prepared in the same manner as that of Example 12 except that a predetermined amount of adduct (I-b) of sodium 2-naphthol-6-sulfonate with one ethylene oxide molecule or sodium salt (I′-1) of hydroxyethyl m-sulfobenzoate (35% by weight solution in ethylene glycol, for comparison) was used instead of of the adduct (I-a). The amount of a residue of the aromatic sulfonic acid compound (I-b) bonded to the end of the backbone chain was 1.2 mole % (B-5), while that of a residue of the aromatic sulfonic acid compound (I′-1) bonded thereto was 1.0 mole % (B′-6), each of the amounts being determined by $^1$H-NMR spectrometry using trifluoroacetic acid-d as a solvent and calculated based on all the repeating ester units.

The characteristic values of the polyesters (B and B′) prepared in the Examples 12 to 17 are given together in Table 6. Further, those of the polyesters (A) used in the following Examples and Comparative Examples are also given therein.

Examples 18 to 27 and Comparative Examples 19 to 26

One of the polyesters (A) listed in the Table 6 was melt-mixed with one of the polyesters (B) and (B′) listed therein at a ratio specified in Table 7 or 8 on a twin-screw extruder having an inner diameter of 30 mm and fitted with a vent to give a pelletized resin composition. The compositions thus prepared were sufficiently dried and evaluated for crystallization characteristics. Thereafter, each composition was injection molded into a test piece for tensile test and this test piece was examined for tensile strength according to ASTM D 638 and evaluated for the rate of crystallization. In the Tables, $T_m$ represents the melting peak temperature of each composition as determined according to JIS K 7120 at a temperature rise rate of 10° C./min and $T_c$ represents the crystallization peak temperature therof as determined according to JIS K 7120 at a temperature drop rate of 10° C./min. The ($T_m - T_c$) value calculated therefrom serves as an indication of the rate of crystallization. A smaller ($T_m - T_c$) value means a higher degree of crystallization acceleration. Further, $\Delta T_c$ represents a difference between the crystallization onset temperature as determined according to JIS K 7120 at a temperature drop rate of 10° C./min and the crystallization peak temperature and a smaller $\Delta T_c$ value means a higher degree of crystallization accerlation.

TABLE 6

|  | Polyester No. | Main repeating unit | Aromatic sulfonic acid compound | Amt. of the compound bonded to the end of the backbone chain (mole %) | Comonomer and its content (mole %) | Intrinsic viscosity |
|---|---|---|---|---|---|---|
| Ex. 12 | B-1 | 1,4-butylene terephthalate | I-a | 1.3 | — | 0.76 |
| Ex. 13 | B-2 | 1,4-butylene terephthalate | I-a | 0.3 | — | 0.78 |
| Ex. 14 | B-3 | 1,4-butylene terephthalate | I-a | 3.0 | — | 0.69 |
| Ex. 15 | B′-4 | 1,4-butylene terephthalate | I-a | 7.5 | — | 0.60 |
| Ex. 16 | B-5 | 1,4-butylene terephthalate | I-b | 1.2 | — | 0.74 |
| Ex. 17 | B′-6 | 1,4-butylene terephthalate | I′-1 | 1.0 | ethylene glycol 0.5 | 0.75 |
|  | A-1 | 1,4-butylene terephthalate | — | — | — | 0.78 |
|  | A-2 | 1,4-butylene terephthalate | — | — | dimethyl isophthalate 20.0 | 0.76 |
|  | A-3 | 1,3-propylene terephthalate | — | — | — | 0.66 |
|  | A-4 | ethylene terephthalate | — | — | — | 0.68 |

TABLE 7

|  | Unit | Ex. 18 | Ex. 19 | Ex. 20 | Ex. 21 | Ex. 22 | Ex. 23 | Ex. 24 | Comp. Ex. 19 | Comp. Ex. 20 | Comp. Ex. 21 | Comp. Ex. 22 | Comp. Ex. 23 |
|---|---|---|---|---|---|---|---|---|---|---|---|---|---|
| Polyester A-1 | (pt. wt.) | 100 | 100 | 100 | 100 | 100 | 100 | 100 | 100 | 100 | 100 | 100 | 100 |
| Polyester B-1 | (pt. wt.) | 5 | 25 | 50 | 75 | — | — | — | — | 0.5 | 150 | — | — |
| Polyester | (pt. wt.) | — | — | — | — | 75 | — | — | — | — | — | — | — |

TABLE 7-continued

|  | Unit | Ex. 18 | Ex. 19 | Ex. 20 | Ex. 21 | Ex. 22 | Ex. 23 | Ex. 24 | Comp. Ex. 19 | Comp. Ex. 20 | Comp. Ex. 21 | Comp. Ex. 22 | Comp. Ex. 23 |
|---|---|---|---|---|---|---|---|---|---|---|---|---|---|
| B-2 Polyester | (pt. wt.) | — | — | — | — | — | 5 | — | — | — | — | — | — |
| B-3 Polyester | (pt. wt.) | — | — | — | — | — | — | 25 | — | — | — | — | — |
| B-5 Polyester | (pt. wt.) | — | — | — | — | — | — | — | — | — | — | 5 | — |
| B'-4 Polyester | (pt. wt.) | — | — | — | — | — | — | — | — | — | — | — | 25 |
| B'-6 Polyester |  |  |  |  |  |  |  |  |  |  |  |  |  |
| $T_m$ | (°C.) | 222.0 | 223.0 | 223.1 | 223.1 | 223.0 | 222.8 | 222.2 | 221.3 | 221.7 | 223.3 | 222.5 | 221.5 |
| $T_m - T_c$ | (°C.) | 27.0 | 25.3 | 24.9 | 24.7 | 25.2 | 25.4 | 26.4 | 35.2 | 33.3 | 24.6 | 24.7 | 33.4 |
| $\Delta T_c$ | (°C.) | 6.3 | 4.9 | 4.6 | 4.5 | 5.0 | 5.2 | 5.0 | 8.7 | 8.7 | 4.3 | 4.5 | 8.6 |
| Tensile strength | (kgf/cm²) | 605 | 590 | 586 | 580 | 585 | 564 | 592 | 600 | 602 | 473 | 493 | 590 |

TABLE 8

|  | Unit | Ex. 25 | Ex. 26 | Ex. 27 | Comp. Ex. 24 | Comp. Ex. 25 | Comp. Ex. 26 |
|---|---|---|---|---|---|---|---|
| Polyester A-2 | (pt. wt.) | 100 | — | — | 100 | — | — |
| Polyester A-3 | (pt. wt.) | — | 100 | — | — | 100 | — |
| Polyester A-4 | (pt. wt.) | — | — | 100 | — | — | 100 |
| Polyester B-1 | (pt. wt.) | 25 | 25 | 25 | — | — | — |
| $T_m$ | (°C.) | 193.8 | 228.7 | 246.7 | 190.9 | 228.7 | 253.0 |
| $T_m - T_c$ | (°C.) | 33.2 | 34.4 | 35.1 | 52.5 | 55.1 | 60.5 |
| $\Delta T_c$ | (°C.) | 8.3 | 7.7 | 11.3 | 12.4 | 11.0 | 27.9 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for preparing a polyester resin by reacting a lower alkyl ester of an aromatic dicarboxylic acid with an aliphatic diol to form an aromatic polyester, which process includes the steps of:
   (i) subjecting to transesterification reaction conditions in the presence of a titanium compound catalyst, a transesterification reaction system which includes the lower alkyl ester of the aromatic dicarboxylic acid, the aliphatic diol and between 0.02 to 5.0 mole percent, based on the amount of the lower alkyl ester of the aromatic dicarboxylic acid, of an aromatic sulfonic acid compound represented by the following general formula (I):

OH—R—O—Ar—SO₃M.         (I)

wherein Ar is a p-substituted benzene group or a 2,6-substituted naphthalene group, R is a divalent group selected from among —CH₂CH(CH₃)—, —CH(CH₃)CH₂—, —CH₂CH(CH₃)— and —CH₂CH₂OCH₂CH₂—, and M is an alkali metal selected from the group consisting of lithium, sodium and potassium, and thereafter (ii) polycondensing the transesterification product to obtain the polyester resin.

2. The process as in claim 1, wherein said aromatic sulfonic acid compound is present in an amount between 0.02 to 1.8 mole percent.

3. The process as in claim 1, wherein said aromatic sulfonic acid compound is present in an amount between 0.1 to 5.0 mole percent.

4. The process as in claim 1, wherein said lower alkyl ester of an aromatic dicarboxylic acid is selected from the group consisting of dimethyl terephthalate, dimethyl 2,6-naphthalenedicarboxylate and dimethyl 2,7-naphthalenedicarboxylate.

5. The process as in claim 1, wherein said aliphatic diol is selected from the group consisting of ethylene glycol, 1,3-propanediol and 1,4-butanediol.

6. The process as in claim 1, wherein said said step (i) includes adding said aromatic sulfonic acid compound to the transesterification reaction system before 90% by weight of the theoretical amount of lower alcohol formed by transesterification, as calculated based on the total amount of the lower alkyl ester of carboxylic acid in the transesterification reaction system, is distilled out of the reaction system.

7. The process as in claim 1, wherein said titanium compound catalyst is a titanium tetraalkoxide.

8. A polyester resin which is produced according to the process of claim 1.

9. A polyester resin having a backbone chain comprised of repeating units derived from 1,4-butylene terephthalate or 1,4-butylene-2,6-naphthalate, and between 0.1 to 5.0 mole percent, based on the total of all repeating ester units, of a residue of an aromatic sulfonic acid compound of the following formula (I) which is bonded to a terminal end of the backbone chain through ester linkages:

OH—R—O—Ar—SO₃M.         (I)

wherein Ar is a p-substituted benzene group or a 2,6-substituted naphthalene group, R is a divalent group selected from among —CH₂CH(CH₃)—, —CH(CH₃)CH₂—, —CH₂CH(CH₃)— and —CH₂CH₂OCH₂CH₂—, and M is an alkali metal selected from the group consisting of lithium, sodium and potassium.

* * * * *